United States Patent [19]

Ogata

[11] Patent Number: 4,895,922

[45] Date of Patent: Jan. 23, 1990

[54] LOW TEMPERATURE SYNTHESIS OF POLYESTERAMIDES

[75] Inventor: Naoya Ogata, Tokyo, Japan

[73] Assignee: The Goodyear Tire & Rubber Company, Akron, Ohio

[21] Appl. No.: 190,426

[22] Filed: May 5, 1988

[51] Int. Cl.$^4$ .............................................. C08G 69/44
[52] U.S. Cl. ................................... 528/179; 528/182; 528/286
[58] Field of Search ........................ 528/286, 179, 182

[56] References Cited

U.S. PATENT DOCUMENTS

| | | | |
|---|---|---|---|
| 4,668,762 | 5/1987 | Ogata | 528/286 |
| 4,758,636 | 7/1988 | Hijikata et al. | 525/438 |
| 4,778,873 | 10/1988 | Ogata | 528/286 |
| 4,804,730 | 2/1989 | Ogata | 528/286 |

OTHER PUBLICATIONS

Yasuda, et al., Jnl. of Polym. Sci., Polym. Chem. Ed., 1983, 21(9), 2609-2616.

Primary Examiner—Maurice J. Welsh
Assistant Examiner—Rabon Sergent
Attorney, Agent, or Firm—Alvin T. Rockhill

[57] ABSTRACT

This invention disclosed a process for the synthesis of polyesteramides. By utilizing the phosphorus containing catalyst systems of the present invention, such polyesteramides can be synthesized at relatively low temperatures. The present invention specifically discloses a process for the synthesis of a polyesteramide which comprises polymerizing at least one diamine, at least one diol, and at least one dicarboxylic acid in the presence of (1) at least one acid acceptor; (2) at least one halogenated organic compound; and (3) at least one phosphorus containing compound selected from the group consisting of (a) triphenylphosphine, (b) triphenylphosphine oxide, (c) triphenylphosphine sulfide, (d) polymeric agents having pendant diphenylphosphine groups, (e) silicon-phosphorus compositions which contain at least one divalent oxygen atom which is bonded directly to a tetravalent silicon atom and a trivalent or pentavalent phosphorus atom; (f) compounds with the structural formula $(C_6H_5)_3P=N-R$, wherein R is a hydrogen atom or an alkyl group containing from 1 to 10 carbon atoms; and (g) compounds with the structural formula $(C_6H_5)PR^1R^2$ wherein $R^1$ and $R^2$ can be the same or different, wherein $R^1$ is selected from the group consisting of alkyl groups containing from 1 to 10 carbon atoms and phenyl groups, and wherein $R^2$ is an alkyl group containing from 1 to 10 carbon atoms.

20 Claims, No Drawings

4,895,922

LOW TEMPERATURE SYNTHESIS OF POLYESTERAMIDES

BACKGROUND OF THE INVENTION

Many high molecular weight condensation polymers can be prepared by utilizing conventional polymerization techniques at elevated temperatures. For example, nylon (66) can be prepared by polycondensing (polymerizing) hexamethylene diamine with adipic acid at a temperature of about 280° C. and polybisphenol A carbonate can be prepared by polycondensing bisphenol A with diphenyl carbonate at a temperature of about 300° C. Condensation polymers of high molecular weight, such as polyesters, polyureas, and polyamides, are generally prepared at temperatures in excess of 200° C. The utilization of high temperatures in such synthesis techniques is, of course, an energy intensive process.

Conventional melt polymerization techniques have not proven to be a viable means of synthesizing polyesteramides. This is because the high polymerization temperatures required of about 250° C. cause degradation of the polymer being synthesized. This is because at the high polymerization temperatures required for the polycondensation reaction, the amine groups present in the diamine being utilized attack the ester-linkage in the polyester amine being synthesized. At the high temperatures required, various other undesirable side reactions can take place. These problems have made the synthesis of polyester amines by conventional melt polymerization techniques at elevated temperatures virtually impossible.

Kitayama, Sanui, and Ogata, "Synthesis of Aromatic Polyesters by Direct Polycondensation with Triphenylphosphine Dichloride", Journal of Polymer Science: Polymer Chemistry Edition, Vol. 22, pages 2705-2712 (1984) discloses the synthesis of high molecular weight aromatic polyesters by the direct polycondensation reaction of dicarboxylic acids and bisphenols or hydroxybenzoic acids utilizing triphenylphosphine dichloride as a condensing agent. U.S. Pat. No. 4,668,762 discloses a catalyst system which is particularly useful for the synthesis of condensation polymers, such as aromatic polyesters and polyamides, which is comprised of (1) at least one silicon-phosphorus compound which contains at least one divalent oxygen atom which is bonded directly to a tetravalent silicon atom and a trivalent or pentavalent phosphorus atom: (2) an acid acceptor: and (3) a halogenated organic compound.

SUMMARY OF THE INVENTION

The present invention discloses a catalyst system and technique which can be used in the synthesis of polyesteramides at low temperatures. Because low polymerization temperatures are utilized, polymer degradation and undesirable side reactions are substantially eliminated. In the synthesis technique of this invention, polyesteramides are prepared by polymerizing at least one dicarboxylic acid with at least one diol and at least one diamine. Such polymerizations are carried out in the presence of at least one acid acceptor, at least one halogenated organic compound and certain phosphorus containing compounds.

The present invention more specifically discloses a process for the synthesis of a polyesteramide which comprises polymerizing at least one diamine, at least one diol, and at least one dicarboxylic acid in the presence of (1) at least one acid acceptor: (2) at least one halogenated organic compound: and (3) at least one phosphorus containing compound selected from the group consisting of (a) triphenylphosphine, (b) triphenylphosphine oxide, (c) triphenylphosphine sulfide, (d) polymeric agents having pendant diphenylphosphine groups, (e) silicon-phosphorus compositions which contain at least one divalent oxygen atom which is bonded directly to a tetravalent silicon atom and a trivalent or pentavalent phosphorus atom: (f) compounds with the structural formula $(C_6H_5)_3P=N-R$, wherein R is a hydrogen atom or an alkyl group containing from 1 to 10 carbon atoms; and (g) compounds with the structural formula $(C_6H_5)PR^1R^2$ wherein $R^1$ and $R^2$ can be the same or different, wherein $R^1$ is selected from the group consisting of alkyl groups containing from 1 to 10 carbon atoms and phenyl groups, and wherein $R^2$ is an alkyl group containing from 1 to 10 carbon atoms.

DETAILED DESCRIPTION OF THE INVENTION

The catalyst systems of the present invention which are useful in the synthesis of polyesteramides are comprised of three components. These components include (1) at least one phosphorus containing compound, (2) an acid acceptor, and (3) at least one halogenated organic compound. For example, catalyst systems which are comprised of (1) at least one silicon-phosphorus compound which contains at least one divalent oxygen atom which is bonded directly to a tetravalent silicon atom and a trivalent or pentavalent phosphorus atom, (2) an acid acceptor, and (3) a halogenated organic compound can be utilized in the synthesis of polyesteramides. In such catalyst systems, it is particularly preferred for the acid acceptor to be in the form of a polymeric agent having bound acid acceptor groups.

Non-polymeric phosphorus containing compounds can be used in the catalyst systems of this invention. For instance, triphenylphosphine, triphenylphosphine oxide and triphenylphosphine sulfide can be used as the phosphorus containing compound component in the catalyst systems of this invention. It is contemplated that alkylated and halogenated phenyl groups can also be utilized in such compositions. Compounds having the structural formula $(C_6H_5)PR^1R^2$ wherein $R^1$ and $R^2$ can be the same or different, wherein $R^1$ is selected from the group consisting of alkyl groups containing from 1 to 10 carbon atoms and phenyl groups, and wherein $R^2$ is an alkyl group containing from 1 to 10 carbon atoms, can also be utilized as the phosphorus containing component in the catalyst systems of this invention. It is also possible to utilize compounds having the structural formula $(C_6H_5)_3P=N-R$, wherein R is a hydrogen atom or an alkyl group containing from 1 to 10 carbon atoms, in the catalyst systems of this invention as the phosphorus containing compound component.

It is also possible to utilize compounds which contain both silicon and phosphorus as the phosphorus containing compound component. Such silicon-phosphorus compounds contain at least one divalent oxygen atom which is bonded directly to a tetravalent silicon atom and to a trivalent or pentavalent phosphorus atom. Such silicon-phosphorus compounds have the general structural formula:

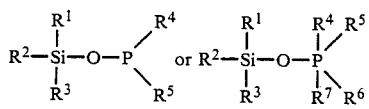

wherein $R^1$, $R^2$, $R^3$, $R^4$, $R^5$, $R^6$ and $R^7$ can be virtually any type of chemical moiety. For instance, $R^1$, $R^2$, $R^3$, $R^4$, $R^5$, $R^6$, and $R^7$ can be alkyl groups which contain from 1 to 20 carbon atoms, aryl groups which contain from 1 to 20 carbon atoms, alkylaryl groups which contain from 1 to 20 carbon atoms, hydrogen atoms, organometallic groups, or inorganic moieties. Additionally, R4, R5R6 and R7 can be halogen atoms with the proviso that no more than 2 of such groups are halogen atoms. Chlorine, bromine, and iodine are particularly useful halogens in such silicon-phosphorus compounds. These groups can have a cyclic structure. In fact, these moieties can be multiply bonded to the silicon and/or phosphorus atoms. The number of possible compositions and structures for such silicon-phosphorus compounds is virtually unlimited.

Silicon-phosphorus compounds having the structural formula:

P(OSiR$_3$)$_3$ wherein R is an alkyl group containing from 1 to 20 carbon atoms are very effective in the catalyst systems of the present invention. In most cases the alkyl groups in such compounds will contain from 1 to 8 carbon atoms. For instance, tris(trimethyl silil) phosphite can be used in the catalyst systems of this invention with great success. R can also represent aryl groups or alkylaryl groups which contain from 1 to 20 carbon atoms. Silicon-phosphorus compounds having the structural formula:

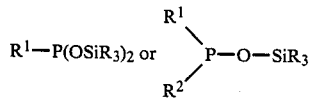

wherein R, $R^1$ and $R^2$ can be the same or different and are selected from the group consisting of alkyl groups containing from 1 to 20 carbon atoms, aryl groups containing from 1 to 20 carbon atoms, and alkylaryl groups containing from 1 to 20 carbon atoms, are also useful in the catalyst systems of the present invention. In most cases, R, $R^1$, and $R^2$ will contain from 1 to 8 carbon atoms.

Silicon-phosphorus compounds having the structural formula:

O=P(OSiR$_3$)$_3$ wherein R is selected from the group consisting of alkyl groups, alkylaryl groups and aryl groups containing from 1 to 20 carbon atoms can also be used in such catalyst systems. Similarly, silicon-phosphorus compounds having the structural formula:

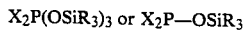

X$_2$P(OSiR$_3$)$_3$ or X$_2$P—OSiR$_3$ wherein X is a halogen atom and wherein R is selected from the group consisting of alkyl groups, alkylaryl groups and aryl groups containing from 1 to 20 carbon atoms, can also be used.

A polymeric silicon-phosphorus composition that can be utilized has the structural formula:

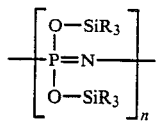

wherein R is an alkyl group, an aryl group or an alkylaryl group and wherein n is an integer. In most cases R will be an alkyl group containing from 1 to 8 carbon atoms or a phenol group. Generally, n will be an integer from about 10 to about 1000. Another polymeric silicon-phosphorus composition that can be used has the structural formula:

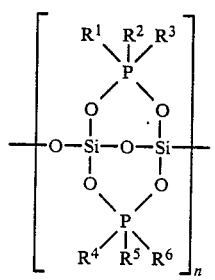

wherein n is an integer and wherein $R^1$, $R^2$, $R^3$, $R^4$, $R^5$, and $R^6$ can be the same or different and are selected from alkyl groups, alkylaryl groups and aryl groups which contain from 1 to 20 carbon atoms. In most cases, n will be an integer from about 10 to about 1000.

In addition to the phosphorus containing compound, these catalyst systems also contain an acid acceptor and a halogenated organic compound. The acid acceptors which can be used are typically organic bases which have a pKa of at least 5. Most commonly such organic bases have a pKa within the range of 5 to 12. The halogenated organic compounds which can be used generally contain at least one carbon atom which has at least two halogen atoms bonded directly to it. Preferably such halogenated organic compounds will contain one or more carbon atoms which have at least three halogen atoms bonded directly to them, such as trichloromethane. Halogenated organic compounds which have a carbon atom with four halogen atoms bonded directly to it, such as carbon tetrachloride and carbon tetrabromide, are most preferred for use in the catalyst systems of the present invention. Silicon-phosphorus compounds which contain halogen atoms can serve the dual purpose of providing both the silicon-phosphorus compound component and the halogenated organic compound component of the catalyst system. Triphenylphosphine dihalides, such as triphenylphosphine dichloride or triphenylphosphine dibromide, also serve the dual purpose of providing both the phosphorus containing compound component and the halogenated organic compound component of such catalyst systems.

In the synthesis of aliphatic polyesteramides, the acid acceptor utilized will normally be bound to a polymer. Such polymeric agents will contain bound acid acceptor groups which have a pKa of at least 5. The acid acceptors which are bound in such polymeric agents are typically organic bases. In most cases the bound organic bases in such polymers will have a pKa within the range of 5 to 12. The polymeric acid acceptors of this invention will commonly contain pendant acid acceptor groups. Poly(4-vinylpyridine) is an example of such a polymeric acid acceptor. Poly(4-vinylpyridine) can be represented by the structural formula:

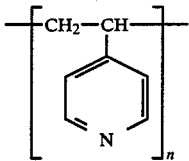

wherein n represents an integer. Polymers which contain pendant pyrrolyl, imidazolyl, pyrazolyl, pyridyl, pyrazinyl, pyrimidinyl, pyridazinyl, indolizinyl, isoindolyl, cinnolinyl, pteridinyl, carbazolyl, phenanthridinyl, acridinyl, or phenanthrolinyl groups are some representative examples of polymeric agents having pendant acid acceptor groups. The polymeric backbone to which such acid acceptor groups are bonded is not of great importance. In fact, the acid acceptor groups can be bonded onto either inorganic or polymeric organic substances. For instance, inorganic glasses which have such acid acceptor groups bonded to them work well in such catalyst systems. It is often convenient to prepare polymeric acid acceptors by simply polymerizing vinyl group containing organic acid acceptors. For instance, polymeric acid acceptors which are suitable for use in the catalyst systems of this invention can be prepared by polymerizing 2-vinylimidazole, 4-vinylimidazole, or 5-vinylimidazole. Poly(4-vinylimidazole) has the structural formula:

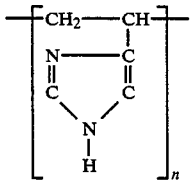

wherein n represents an integer. It is also possible to build acid acceptor groups directly into polymer chains. For instance, acid acceptor groups having the structural formula:

can be built into polymeric agents in order to make them suitable acid acceptors for utilization in the practice of this invention.

Polymeric agents which contain both pendant phenylphosphine groups and bound acid acceptor groups can also be utilized in the catalyst systems of this invention. For instance, such a polymeric agent can be prepared by polymerizing vinyldiphenylphosphine and 4-vinylpyridine. Such a polymeric copolymer has the structural formula:

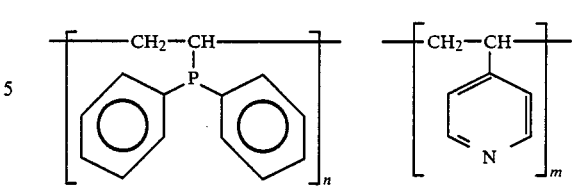

wherein n and m represent integers and wherein indicates that the distribution of repeat units can be random. Such polymeric agents which contain both pendant diphenylphosphine groups and bound acid acceptor groups are highly desirable for utilization in the practice of the present invention because they greatly simplify the recovery of the acid acceptor and the phosphorus containing component of the catalyst system. It is, of course, also possible to use a polymeric agent having pendant diphenylphosphine groups in conjunction with a second polymeric agent which contains bound acid acceptor groups.

The acid acceptor and the phosphorus containing compound can be employed in amounts which result in there being approximately equal molar amounts of acid acceptor groups, phosphorus atoms (in the phosphorus containing compound component), and monomers in the polymerization system.

It has been determined that a molar ratio of phosphorus atoms to monomer of about 1.2:1 is optimal. In most cases a molar ratio of phosphorus atoms to monomer which is within the range of 0.8:1 to 2:1 will be used. It is preferred for the molar ratio of phosphorus atoms to monomer to be within the range of 1.0:1 to 1.5:1. The molar ratio of acid acceptor groups to monomer will generally be at least 1:1. Large excesses of the acid acceptor wherein the ratio of acid acceptor groups to monomer is much greater than 1:1 can be used without creating problems. For example, an organic base, such as pyridine, can be used as the solvent in the reaction medium. Ratios of acid acceptor groups to monomer of less than 1:1 can be used but conversions will be reduced. In most cases at least one mole of reactive halogen atoms (in the halogenated organic compound) will be employed per mole of monomer. For example, at least 1 mole of tetrachloromethane (carbon tetrachloride) or at least ½ mole of hexachloroethane could be employed per mole of monomer. A ratio of reactive halogen atoms to monomer of less than 1:1 will reduce conversions in the polymerization but large ratios of acid acceptor groups to monomer which are greatly in excess of 1:1 are not detrimental.

Typically the polymerization will be conducted in an inert organic solvent. Any inert organic solvent which provides sufficient solubility can be utilized. Aromatic organic solvents, such as pyridine or alkyl substituted pyridines (picoline or lutidine) will typically be employed because they normally provide good solubility. Dimethylformamide is an example of an aliphatic liquid that provides good solubility.

The reaction mediums utilized in the polymerizations of this invention are comprised of the inert organic solvent, the catalyst system and the monomers being polymerized. Such reaction mixtures normally contain from about 0.05 to 1 moles of monomer per liter of solution. However, it is permissible to utilize the maximum amount of monomer which is soluble in the particular organic solvent being used. More typically such reaction mixtures will contain from about 0.1 to about 0.5 moles of monomer per liter of solution. In most cases, the molar amount of dicarboxylic acid monomers in the reaction medium will be approximately equal to the total molar amount of diol monomers and diamine monomers in the reaction medium. As a general rule, the ratio of diol monomers to diamine monomers will be within the range of about 10:90 to about 90:10.

The polymerizations of this invention will normally be carried out at a temperature between about 10° C. and about 170° C. Preferably such polymerizations will be conducted at a temperature of from 80° C. to 130° C.

Catalyst systems which utilize a polymeric agent having pendant diphenyl phosphine dihalide groups in conjunction with an acid acceptor can also be used. Such pendant diphenylphosphine dihalide groups can be represented by the structural formula:

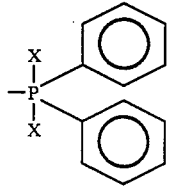

wherein X represents a halide atom. The polymeric backbone to which such diphenylphosphine dihalide groups are bonded is not of great importance. In fact, the diphenylphosphine dihalide groups can be bonded to either inorganic or polymeric organic substances. For instance, inorganic glasses which have such diphenylphosphine dihalide groups bonded to them work well in such catalyst systems. Organic polymers, such as polystyrene can also be used to support pendant diphenylphosphine dihalide groups. Normally the diphenylphosphine dihalide will be diphenylphosphine dichloride. The triphenylphosphine dihalide transforms into a triphenylphosphine oxide after the polycondensation and the triphenylphosphine oxide can be converted back to a triphenylphosphine dihalide by treatment with either an oxalyl halide

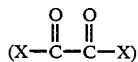

or a carbonyl dihalide

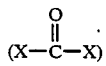

at a temperature from 0° C. to 50° C.

The polyesteramides made in accordance with the present invention are prepared by reacting one or more diamines and one or more dicarboxylic acids with one or more diols. The dicarboxylic acids utilized in the preparation of such polyesteramides are normally alkyl dicarboxylic acids which contain from 4 to 36 carbon atoms, aryl dicarboxylic acids which contain from 8 to 20 carbon atoms, and alkyl substituted aryl dicarboxylic acids which contain from 9 to 22 carbon atoms. The preferred alkyl dicarboxylic acids will contain from 4 to 12 carbon atoms. Some representative examples of such alkyl dicarboxylic acids include glutaric acid, adipic acid, pimelic acid, and the like. The preferred aryl dicarboxylic acids contain from 8 to 16 carbon atoms.

Some representative examples of aryl dicarboxylic acids are terephthalic acid, isophthalic acid, and orthophthalic acid. The preferred alkyl substituted aryl dicarboxylic acids contain from 9 to 16 carbon atoms.

The diamine component utilized in the preparation of polyesteramides is normally a diamine that contains from 2 to 12 carbon atoms. Preferred diamines normally contain from 2 to 8 carbon atoms with preferred diamines containing from 4 to 8 carbon atoms. Some representative examples of diamines that can be utilized in the synthesis of polyesteramides include ethylenediamine, hexamethylenediamine, bis(4-amino-cyclohexyl)-methane, o-phenyldiamine, m-phenylenediamine, p-phenylenediamine, 1,2-diamino-3,5-dichlorobenzene, 1,3-diamino-2,5-dichlorobenzene, 1,2-diamino-4-methylbenzene, 1,4-diamino-2-isopropylbenezene, 1,3-diaminopropane, 1,4-diaminobutane, and the like.

The diol component utilized in making aromatic polyesteramides in accordance with the present invention are aromatic diols which normally contain from 6 to 20 carbon atoms. Bisphenol A is a good example of an aromatic diol that can be used. Some other aromatic diols which can be used include 1,2-dihydroxybenzene (catechol), 1,3-dihydroxybenzene
(resorcinol), 1,4-dihydroxybenzene (hydroquinone),
1,2-dihydroxy-3,5-dimethylbenzene,
1,2-dihydroxy-4,5-dimethylbenzene,
1,4-dihydroxy-2,3-dimethylbenzene,
2,4-dihydroxy-1-ethylbenzene,
2,4-dihydroxy-1-hexylbenzene,
1,4-dihydroxy-2-iodobenzene,
2,4-dihydroxy-1-isobutylbenzene,
1,2-dihydroxy-4-isopropylbenzene,
1,4-dihydroxy-2-isopropylbenzene,
1,4-dihydroxy-2-isopropyl-5-methylbenzene,
1,3-dihydroxy-2-methylbenzene,
2,4-dihydroxy-1-(3-methyl-butyl)benzene,
2,4-dihydroxy-1-(4-methylpentyl)benzene,
1,3-dihydroxy-4-pentylbenzene,
1,3-dihydroxy-5-pentylbenzene,
1,4-dihydroxy-2,3,5,6-tetrabromobenzene,
1,3-dihydroxy-2,4,5,6-tetrachlorobenzene,
1,4-dihydroxy-2,3,5,6-tetramethylbenzene, and the like.

The diol component utilized in making aliphatic polyesteramides in accordance with this invention are normally diols which contain from 2 to 8 carbon atoms. The diols which are most commonly used contain from 2 to 6 carbon atoms and have the structural formula HO—A—OH, wherein A is an alkylene group. Ethylene glycol, 1,4-butane diol and 1,6-hexane diol are the most commonly used diols in making such polyesteramides.

The polyesteramides which are prepared utilizing the catalyst system of the present invention can be made in a manner so as to induce branching. Such branching is normally attained by utilizing a branching agent in the synthesis of the polyesteramide. Such branching agents normally contain three or more functional groups and preferably contain three or four functional groups. The reactive groups may be carboxyl or aliphatic hydroxyl. The branching agent can contain both types of groups. Examples of acidic branching agents include trimesic acid, trimellitic acid, pyromellitic acid, butane tetracarboxylic acid, naphthalene tricarboxylic acids, cyclohexane-1,3,5-tricarboxylic acids, and the like. Some representative examples of hydroxyl branching agents (polyols) include glycerin, trimethylol propane, pentaerythritol, dipenterythritol, 1,2,6-hexane triol, and 1,3,5-trimethylol benzene. Generally, from 0 to 3 percent of a polyol containing from 3 to 12 carbon atoms will be used as the branching agent (based upon the total diol component).

ages, while halogenated solvents, such as monochlorobenzene, favor the formation of ester linkages. In any case, this series of experiments clearly shows that polyesteramides can be prepared utilizing the process of this invention in high yields. The copolyester amides produced in Examples 2-9 have the structural formula:

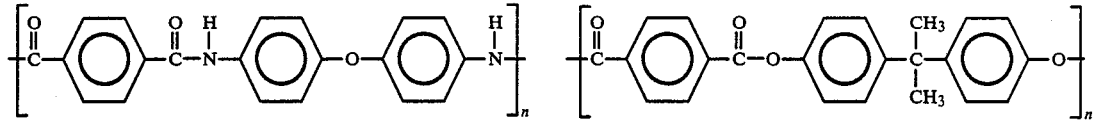
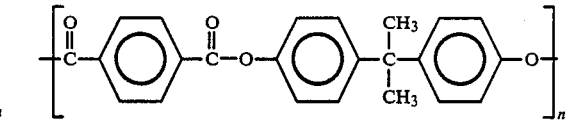

This invention is illustrated by the following examples which are merely for the purpose of illustration and are not to be regarded as limiting the scope of the invention or the manner in which it can be practiced. Unless specifically indicated otherwise, parts and percentages are given by weight.

wherein

— — indicates that the distribution of repeat units can be in random order and wherein n represents an integer.

EXAMPLES 1-9

In this series of experiments, polyesteramides were prepared by polycondensing terephthalic acid (TPA) with 4,4'-diaminodiphenylether (APE) and bisphenol A (BPA). In this series of experiments, various ratios of APE and BPA were utilized. The amount of APE and BPA utilized in each example in this series of experiments is indicated in Table I. In Examples 1-5, the polymerization was carried out utilizing monochlorobenzene as the solvent. In Examples 6-9, a mixed solvent system which contained monochlorobenzene and N-methylpyrrolidone in a 1:1 volume ratio was utilized as the solvent system.

The polymerization mediums utilized in this series of experiments contained one mole of monomer per liter of solution. The catalyst system employed was comprised of triphenylphosphine dichloride and triethylamine. The polymerizations were carried out at a temperature of 130° C. for a period of about 1 hour. The polymer yield attained, the specific viscosity of the polymer produced and the amount of APE and BPA incorporated into the polyesteramides which were produced are shown in Table I.

TABLE I

| Ex. | Monomer Ratio APE = BPA | Yield | η sp/c* | Bound Ratio APE:BPA |
|---|---|---|---|---|
| 1 | 0:100 | 100% | 0.31 | 0:100 |
| 2 | 20:80 | 89% | 0.35 | 20:80 |
| 3 | 40:60 | 78% | 0.29 | 35:65 |
| 4 | 60:40 | 82% | 0.32 | 36:64 |
| 5 | 80:20 | 78% | 0.25 | 58:42 |
| 6 | 20:80 | 86% | 0.45 | 25:75 |
| 7 | 40:60 | 85% | 0.35 | 43:57 |
| 8 | 60:40 | 87% | 0.32 | 65:35 |
| 9 | 80:20 | 91% | 0.29 | 85:15 |

*Measured in o-chlorophenyl at 30° C. at a concentration of 0.1 g/10 ml

As can be seen by reviewing Table I, the polyesteramides produced had monomeric make ups which were virtually identical to the monomer feed ratios in the polymerization medium utilized when the mixed solvent system containing N-methylpyrrolidone and monochlorobenzene was used. On the other hand, bisphenol A was incorporated into the polyesteramide produced in larger amounts when monochlorobenzene was utilized as the solvent for the copolycondensation reaction. In other words, amide solvents such as N-methylpyrrolidone favor the formation of amide link-

EXAMPLES 10-14

In this series of experiments polyesteramides were prepared by the direct polycondensation of TPA with diaminobisphenol (ABP). The polymerization was catalyzed by utilizing triphenylphosphine dichloride with triethylamine as the acid acceptor. The polymerization mediums were prepared so as to contain a monomer concentration of one mole per liter. The polymerization reaction was carried out at a temperature of 130° C. for a period of about 1 hour. In Examples 10 and 13, monochlorobenzene was utilized as the solvent. In Examples 11 and 14, a mixed solvent system containing a 50/50 mixture of monochlorobenzene and N-methylpyrrolidone was utilized as the solvent. In Example 12 a mixed solvent system containing 50% monochlorobenzene and 50% dimethylacetamide was utilized as the solvent system. In Examples 13 and 14, terephthaloyl chloride was utilized as a monomer instead of TPA. The polymer yield attained, the mole percent of amide linkages in the polymer produced, and the specific viscosity of the polymer produced is shown in Table II.

TABLE II

| Example | Yield | Mole % Amide | η sp/c* |
|---|---|---|---|
| 10 | 78% | 42 | 0.35 |
| 11 | 100% | 85 | 0.65 |
| 12 | 100% | 83 | 0.55 |
| 13 | 59% | 41 | 0.21 |
| 14 | 49% | 38 | 0.23 |

*Measured in dimethylacetamide containing 7% lithium chloride at 30° C. at a concentration of 0.1 g/10 ml.

Since diaminobisphenol contains both amino groups and hydroxyl groups in the same molecule, the selectivity of the amino and hydroxy functional groups toward polycondensation is clear from reviewing Table II. This is because there is no chance of blending of two homopolymers, that is, polyamide and polyester. Thus, this series of experiments supports the fact that chlorobenzene favors the formation of ester linkages and amide solvents such as N-methylpyrrolidone, enhance the formation of amide linkages. Accordingly, polyesteramides containing desired amounts of ester and amide linkages can be prepared by utilizing the appropriate solvent system. It is, of course, also possible to control the bound ratio of diamines and diols by varying the amount of diamine and diol utilized in the polymerization medium.

Variations in the present invention are possible in light of the descriptions of it provided herein. It is therefore, to be understood that changes can be made in the particular embodiments described which will be within the full intended scope of the invention as defined by the following appended claims.

What is claimed is:

1. A process for the synthesis of a polyesteramide which comprises polymerizing at least one diamine, at least one diol, and at least one dicarboxylic acid in the presence of (1) at least one acid acceptor; (2) at least one halogenated organic compound which contains at least one carbon atom which has at least three halogen atoms bonded directly to it; and (3) triphenylphospine oxide.

2. A process as specified in claim 1 wherein the dicarboxylic acid is terephthalic acid.

3. A process as specified in claim 2 wherein the diol is bisphenol A.

4. A process as specified in claim 3 wherein the diamine is 4,4,-diaminodiphenylether.

5. A process as specified in claim 4 wherein said synthesis is conducted in monochlorobenzene.

6. A process as specified in claim 1 wherein the acid acceptor is an organic base having a pKa which is within the range of 5 to 12.

7. A process as specified in claim 1 wherein the synthesis is conducted at a temperature which is within the range of about 10° C. to about 170° C.

8. A process as specified in claim 1 wherein the molar ratio of phosphorus atoms in the phosphorus containing compound to monomers is within the rang of about 0.8:1 to about 2.1.

9. A process as specified in claim 1 wherein the diol is an aromatic diol.

10. A process as specified in claim 1 wherein the acid acceptor is an organic base which has a pKa of at least 5.

11. A process as specified in claim 1 wherein the acid acceptor is bound to a polymer.

12. A process as specified in claim 11 wherein the acid acceptor is poly(4-vinylpyridine).

13. A process for the synthesis of a polyesteramide which comprises polymerizing at least one diamine, at least one diol, and at least one dicarboxylic acid in the presence of (1) at least one acid acceptor; (2) at least one halogenated organic compound which contains at least one carbon atom which has at least three halogen atoms bonded directly to it; and (3) triphenylphosphine sulfide.

14. A process as specified in claim 13 wherein the dicarboxylic acid is terephthalic acid; wherein the diol is bisphenol A; and wherein the diamine is 4,4,-diaminodiphenylether.

15. A process as specified in claim 13 wherein said synthesis is conducted in monochlorobenzene.

16. A process as specified in claim 13 wherein the acid acceptor is an organic base having a pKa which is within the range of 5 to 12; and wherein the synthesis is conducted at a temperature which is within the range of about 10° C. to about 170° C.

17. A process as specified in claim 13 wherein the molar ratio of phosphorus atoms in the phosphorus containing compound to monomers is within the range of about 0.8:1 to about 2:1.

18. A process as specified in claim 13 wherein the diol is an aromatic diol; wherein the acid acceptor is an organic base which has a pKa of a least 5.

19. A process as specified in claim 13 wherein acid acceptor is bound to a polymer.

20. A process as specified in claim 19 wherein the acid acceptor is poly(4-vinylpyridine).

* * * * *